(12) United States Patent
Liu et al.

(10) Patent No.: US 7,419,742 B2
(45) Date of Patent: Sep. 2, 2008

(54) BATTERY COVER ASSEMBLY FOR PORTABLE ELECTRONIC DEVICE

(75) Inventors: Tai-Jun Liu, Shenzhen (CN); Rui-Hao Chen, Shenzhen (CN); Peng-Jin Ge, Shenzhen (CN); Gang Yang, Shenzhen (CN); Shui-Yuan Qin, Shenzhen (CN); Hsiao-Hua Tu, Tu-cheng (TW)

(73) Assignees: Shenzhen Futaihong Precision Industrial Co., Ltd., Shenzhen, Guangdong Province (CN); Sutech Trading Limited, Tortola (VG)

( * ) Notice: Subject to any disclaimer, the term of this patent is extended or adjusted under 35 U.S.C. 154(b) by 120 days.

(21) Appl. No.: 11/265,585

(22) Filed: Nov. 2, 2005

(65) Prior Publication Data

US 2006/0109610 A1 May 25, 2006

(30) Foreign Application Priority Data

Nov. 19, 2004 (TW) .............................. 93218559 U

(51) Int. Cl.
*H01M 2/10* (2006.01)
(52) U.S. Cl. ........................................ 429/97; 429/100
(58) Field of Classification Search .................. 429/9, 429/90, 97, 100; 455/347; *H01M 2/04, 2/10*
See application file for complete search history.

(56) References Cited

U.S. PATENT DOCUMENTS 4,965,141 A * 10/1990 Suzuki ........................... 429/9

| | | | |
|---|---|---|---|
| 7,058,295 B2 * | 6/2006 | Nishiwaki | 429/100 |
| 7,209,363 B2 * | 4/2007 | Liu et al. | 361/801 |
| 2004/0147233 A1 * | 7/2004 | Chen | 455/90.3 |
| 2006/0121338 A1 * | 6/2006 | Ge et al. | 429/97 |
| 2006/0148442 A1 * | 7/2006 | Liu et al. | 455/347 |
| 2006/0166083 A1 * | 7/2006 | Zhang et al. | 429/97 |

FOREIGN PATENT DOCUMENTS

JP  2001-258748  * 1/2000

OTHER PUBLICATIONS

IPDL JPO machine translation for JP 2001-258748.*

* cited by examiner

*Primary Examiner*—Stephen J. Kalafut
(74) *Attorney, Agent, or Firm*—Morris Manning Martin LLP; Tim Tingkang Xia, Esq.

(57) ABSTRACT

A battery cover assembly includes a battery cover (10), a moveable member (12), an elastic apparatus (13) and a housing (14). The battery cover defines a button hole (101), and a locking portion (104) is disposed in one side of the battery cover. The moveable member includes a main beam (121) and at least one arm (124). The main beam includes a button (122) received in the button hole. The moveable member is slidably attached to the battery cover. The elastic apparatus includes at least one concave portion (1321). The concave portion includes a clasp (1324) and defines a latching hole (1326). The locking portion engages in the latching hole. The concave portion resists the arm of the moveable member. The housing defines a latching hole (145). The clasp of the elastic apparatus detachably engages in the hole of the housing. This provides a user with convenient disassembling operation.

20 Claims, 5 Drawing Sheets

BATTERY COVER ASSEMBLY FOR PORTABLE ELECTRONIC DEVICE

FIELD OF THE INVENTION

The present invention generally relates to battery cover assemblies, and particularly to a battery cover assembly for use in a portable electronic device.

BACKGROUND OF THE INVENTION

Batteries are widely used in portable electronic devices, such as personal digital assistants (PDAs), mobile phones and so on. Conventional batteries are attachably received in the electronic device, and battery covers are designed to connect with housings of the electronic devices to package the batteries. The batteries have to be replaced by opening the battery covers when the batteries are damaged, or dead or needs to be recharged with electricity any more.

A clasp structure or latch structure is used with a conventional battery cover to engage with a housing of a portable electronic device. For example, a mobile phone marked Alcatel OT310 has a latch for the battery cover. The latch includes a pair of hooks at one end of the battery cover and a locking pin protruding from the other end of the battery cover. Accordingly, a pair of grooves is defined in an end portion of a backside of a housing of the mobile phone, and a locking hole is defined in the other end portion of the backside of the housing. In assembly, the hooks are firstly inserted into the troughs in the backside of the housing. Then, the battery cover is pressed downwardly to the housing until the locking pin on the battery cover is inserted into the locking hole in the backside of the housing. The battery cover is thus assembled to the housing of the mobile phone. The battery cover is simple in structure, and the engagement between the battery cover and the housing of the mobile phone is firm, too. However, during disassembly, it is needed to use great efforts to disassemble the battery cover, since a greater force is exerted thereon. Therefore, the battery cover is susceptible to be damaged. As a result, it is inconvenient for a user to replace a battery in the housing of the mobile phone.

Therefore, a new battery cover assembly is desired in order to overcome the above-described shortcomings.

SUMMARY

A battery cover assembly for a portable electronic device is provided, which is convenient for a user to operate and which is durable.

In one embodiment thereof, the battery cover assembly includes a battery cover, a moveable member, an elastic apparatus and a housing. The battery cover defines a button hole, and one side of the battery cover includes a locking portion. The moveable member includes a main beam and at least one arm. The main beam includes a button received in the button hole. The moveable member is slidably attached to the battery cover. The elastic apparatus includes at least one concave portion. The concave portion includes a clasp and defines an engaging hole. The locking portion of the battery cover engages in the engaging hole. The concave portion resists the arm of the moveable member. The housing defines a latching hole. The clasp of the elastic apparatus is detachably engaging with the latching hole of the housing. This provides a user with convenient disassembling operation of the device.

Other advantages and novel features will become more apparent from the following detailed description when taken in conjunction with the accompanying drawings, in which:

DETAILED DESCRIPTION OF THE EMBODIMENTS

The present invention is suitable for portable electronic devices such as mobile phones, PDAs and so on having a separable component like a battery or a battery module.

Figure 1:
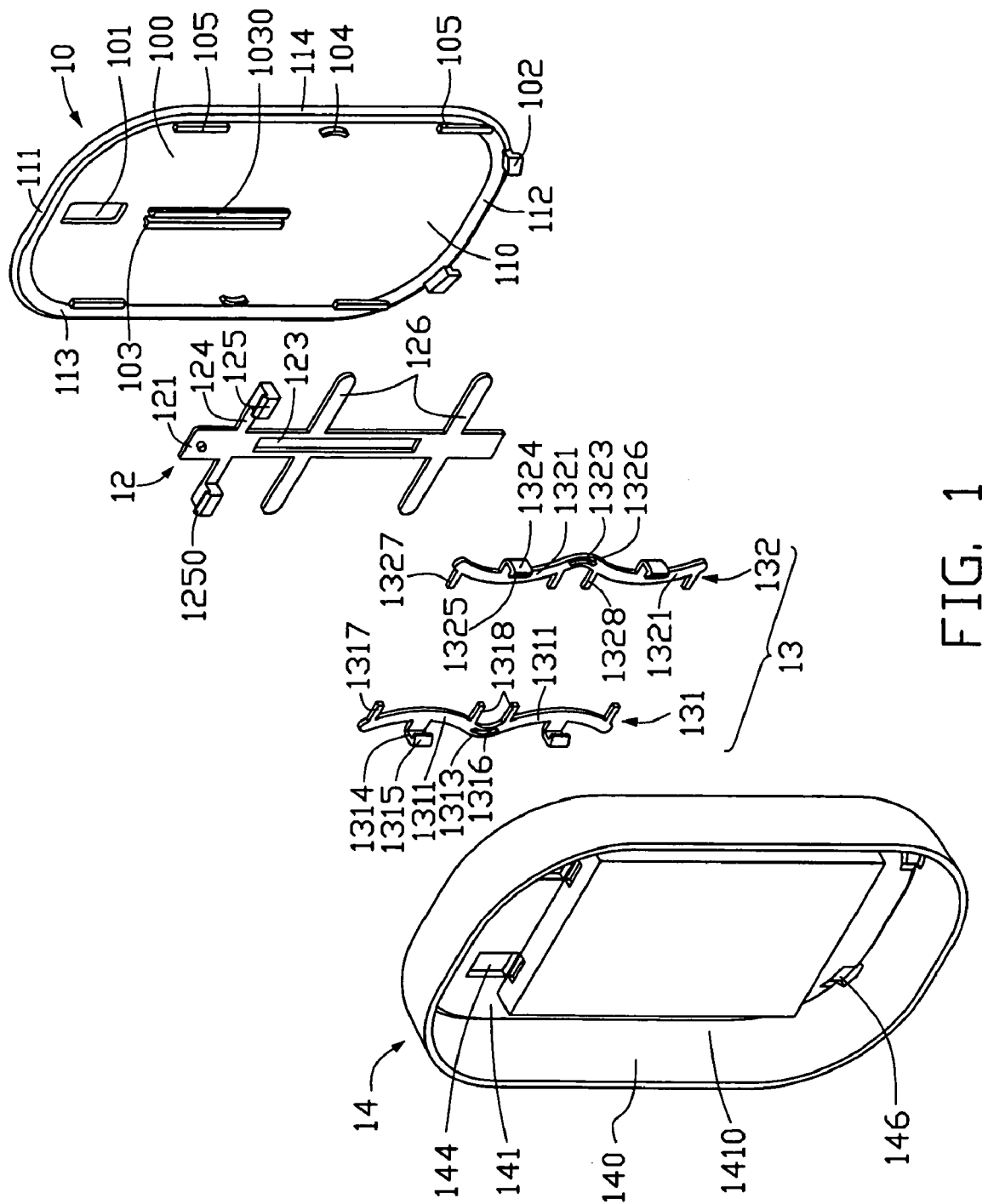
FIG. 1 is an exploded, isometric view of a battery cover assembly in accordance with a preferred embodiment of the present invention.
Figure 2:
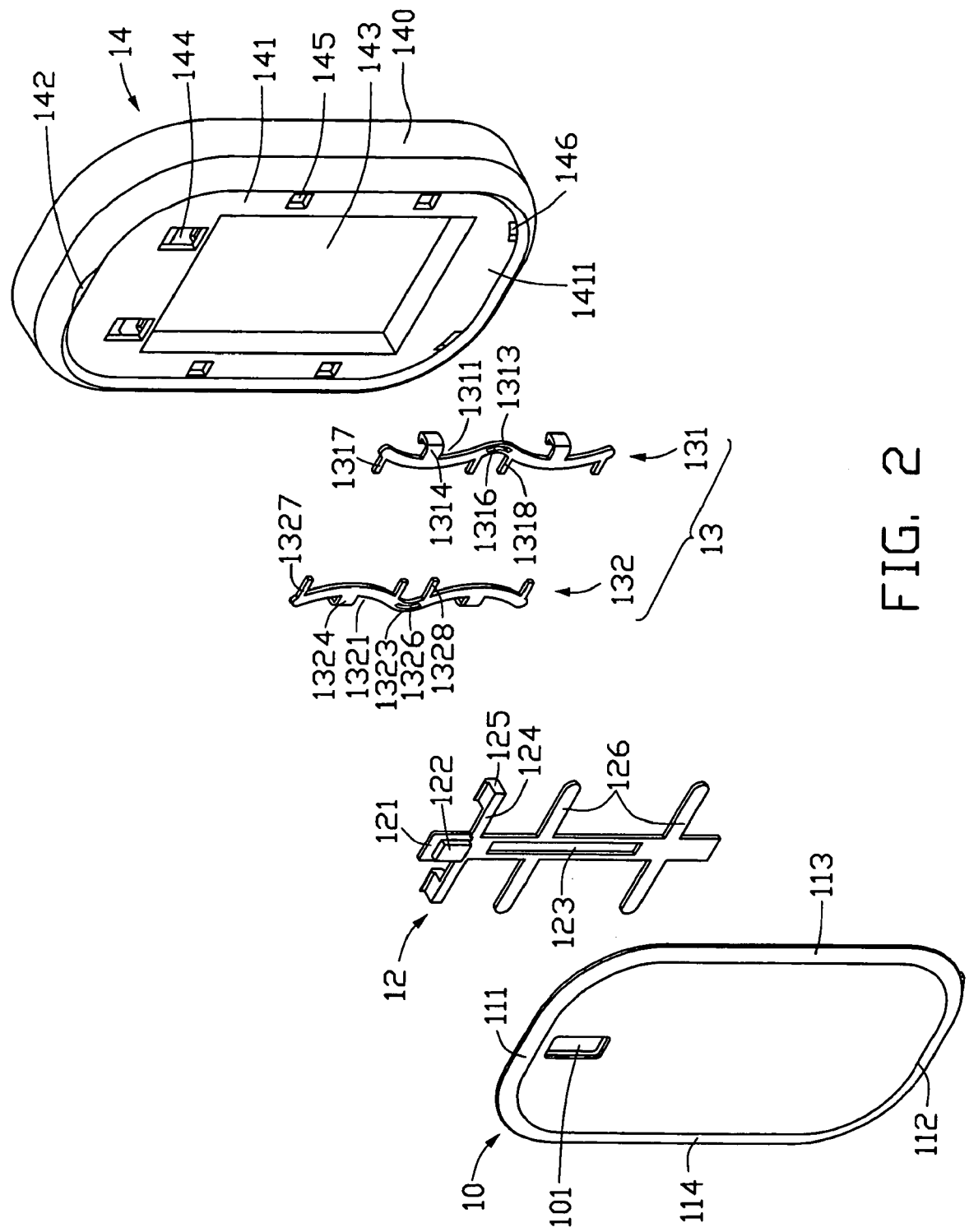
FIG. 2 is similar to FIG. 1, but viewed from another aspect.

Referring now to the drawings in detail, FIG. 1 and FIG. 2 show a battery cover assembly for use in a mobile phone (not shown). The mobile phone is taken here as an exemplary application, for the purposes of describing details of a battery cover assembly of a preferred embodiment of the present invention. The battery cover assembly includes a removable battery cover 10, a moveable member 12, an elastic apparatus 13, and a housing 14. The moveable member 12 and the elastic apparatus 13 are latched in the cover 10. Accordingly, the cover 10 is engaged with the housing 14 of the mobile phone by means of the moveable member 12 and the elastic apparatus 13.

The cover 10 includes a main body 110, a top wall 111, a bottom wall 112, a left sidewall 113, and a right sidewall 114. The main body 110 includes an inner surface 100, which together with the top wall 111, the bottom wall 112, the left sidewall 113 and the right sidewall 114 defines a substantially rectangular space (not labeled). A rectangular button hole 101 is defined in a middle upper portion of the main body 110, near the top wall 111. At least one detent 102 extends from the bottom wall 112. In the illustrated embodiment, the at least one detent 102 is two spaced L-shaped tabs 102 that extend inward and down from the bottom wall 112. A pair of parallel, symmetrical elastic ribs 103 is formed on the inner surface 100. Each elastic rib 103 has an L-shaped cross-section, and comprises an elongate top end 1030. The top end 1030 is distal from and parallel to the inner surface 100. Two symmetrically opposite arcuate projections 104 are formed on a middle portion of the inner surface 100, respectively near the left sidewall 113 and the right sidewall 114. In addition, the inner surface 100 has four elongate limiting blocks 105 formed at four corners thereof respectively.

The moveable member 12 includes a vertical main beam 121, and a first arm 124 and two second arms 126 horizontally crossing the main beam 121. The main beam 121 is substantially an elongate, flat board. A button 122 is formed on a top end of an inner surface of the main beam 121. The button 122 is received in the button hole 101 of the cover 10 from an inside thereof, and is exposed at an outside of the cover 10. A length of the button 122 is shorter than a length of the button hole 101, whereby the button 122 can be slid in the button hole 101 by hand. The main beam 121 defines an elongate receiving groove 123 in a middle thereof. A length of the receiving groove 123 is longer than a length of the ribs 103, which permits the ribs 103 to be slidable in and along the receiving groove 123. The second arms 126 are located below the first arm 124. Two symmetrically opposite claws 125 extend perpendicularly inward from two opposite ends of the first arm 124 respectively. Each claw 125 has a wedge-shaped distal end 1250. Two opposite ends of each second arm 126 each have a semicircular configuration.

The elastic apparatus 13 is made up of a first elastic member 131 and a second elastic member 132, which are symmetrically opposite, separate, elongate pieces. The elastic apparatus 13 is made of elastic material. A main body of the first elastic member 131 is a wave-shaped, flat board having a uniform width. The first elastic member 131 includes two concave portions 1311, and a projecting portion 1313 located between the concave portions 1311. A U-shaped clasp 1314 extends from a distal side edge of each concave portion 1311. A distal end of the clasp 1314 is located generally inward from and parallel to the concave portion 1311. The distal end has a beveled surface 1315. A first blocking arm 1317 extends from a proximal side edge of each concave portion 1311, at a free end of the concave portion 1311. Two parallel second blocking arms 1318 extend from a proximal side edge of the projecting portion 1313. The projecting portion 1313 defines an arcuate slot 1316, for engagingly receiving a corresponding projection 104 of the cover 10. The second elastic member 132 has a symmetrically identical structure to that of the first elastic member 131. The second elastic member 132 also includes two concave portions 1321, a projecting portion 1323, two clasps 1324, an arcuate slot 1326, two first blocking arms 1317, and two second blocking arms 1328. Each clasp 1324 includes a beveled surface 1325.

The housing 14 includes a main partition wall 141 and a peripheral sidewall 140. A partition wall 141 separates a first compartment 1410 from a generally opposite second compartment 1411. The first compartment 1410 is for accommodating an electronic device, such as a printed circuit board, therein. This is done when the housing 14 is assembled with other housings of the mobile phone. The second compartment 1411 is used to engagingly receive the cover 10. A recess 143 is defined in a middle portion of the partition wall 141 at the second compartment 1411. The recess 143 is used to receive a battery. Two spaced latching grooves 144 are defined in the partition wall 141 above a top end of the recess 143. The latching grooves 144 are for receiving the claws 125 of the moveable member 12 therein. Two pairs of latching holes 145 are defined in the partition wall 141, at opposite sides of the recess 143 respectively. The latching holes 145 are used to engagingly receive the clasps 1314, 1324 of the elastic apparatus 13. A concavity 142 is defined in a top end of the sidewall 142 at the second compartment 1411. At least one detent hole 146 is defined in a bottom end of the partition wall 141. In the illustrated embodiment, the at least one detent hole 146 is two spaced tab holes 146. The tab holes 146 are defined in the bottom end of the partition wall 141, adjacent the sidewall 140. The tab holes 146 are for engagingly receiving the tabs 102 of the cover 10. In particular, the tabs 102 are removably engaged in the tab holes 146.

Figure 3:
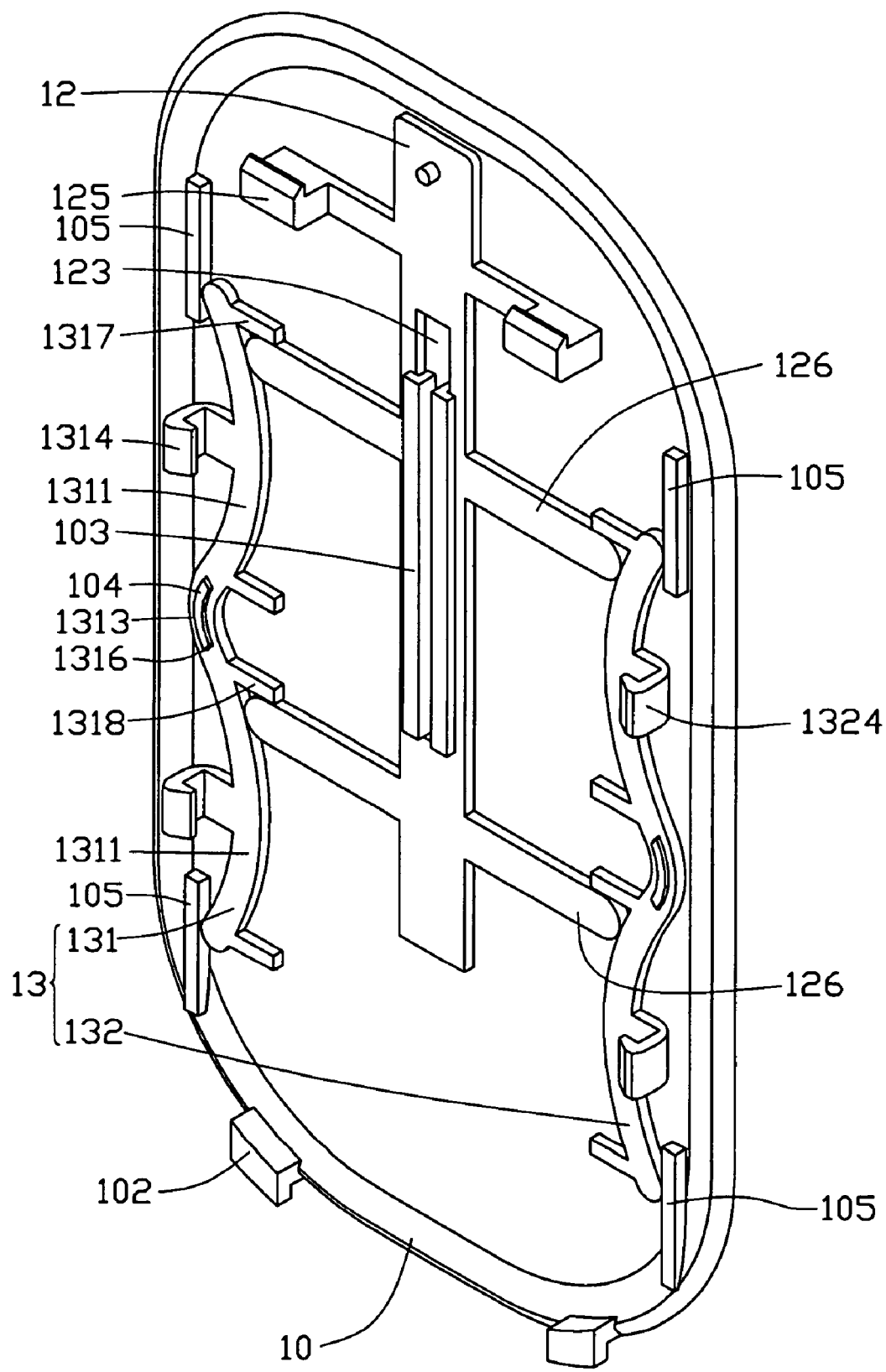
FIG. 3 is an enlarged, assembled view of a cover, a movable member and an elastic apparatus of the battery cover assembly shown in FIG. 2.
Figure 4:
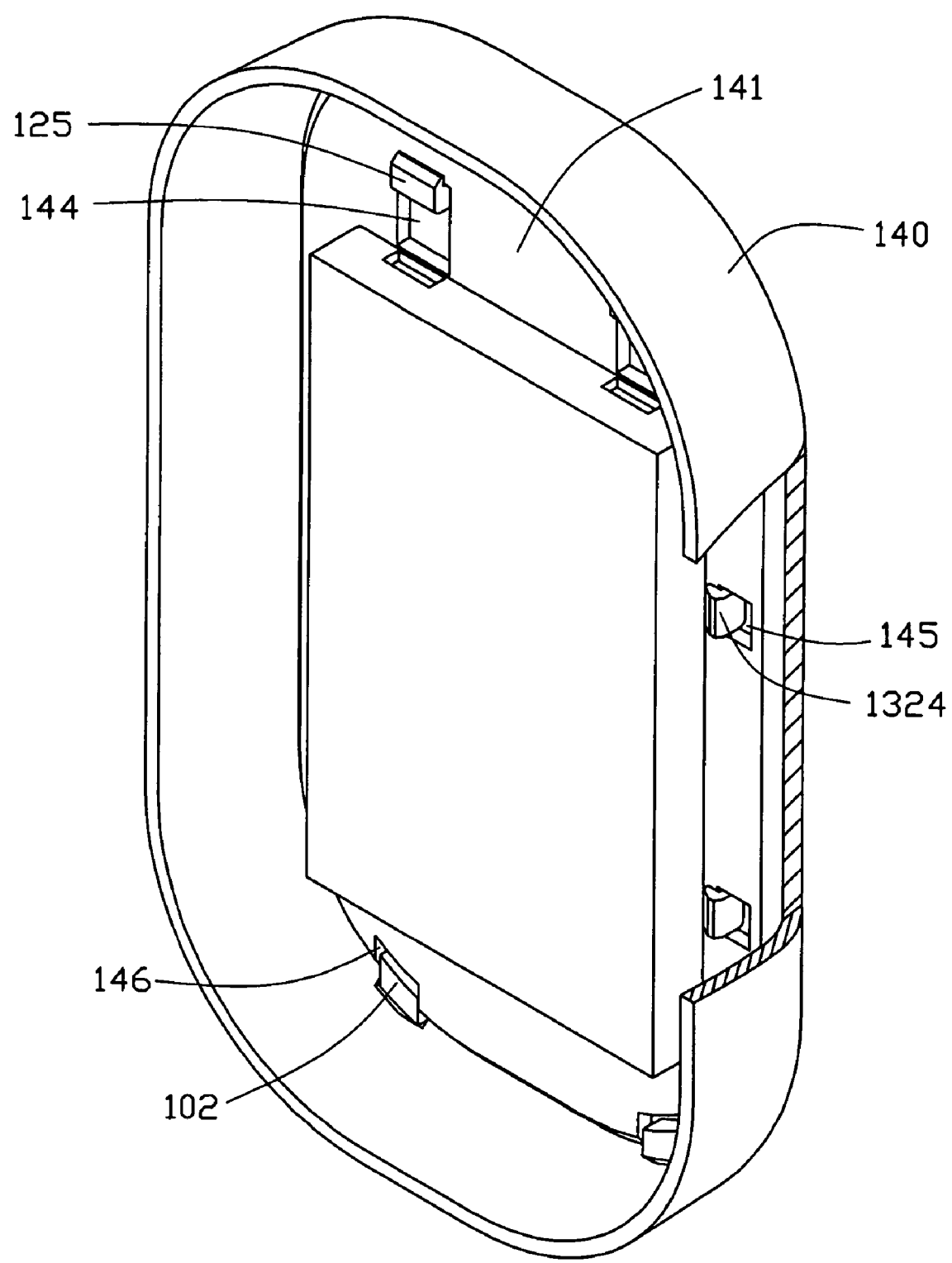
FIG. 4 is an enlarged, assembled, partially cut-away view of the battery cover assembly shown in FIG. 1.
Figure 5:
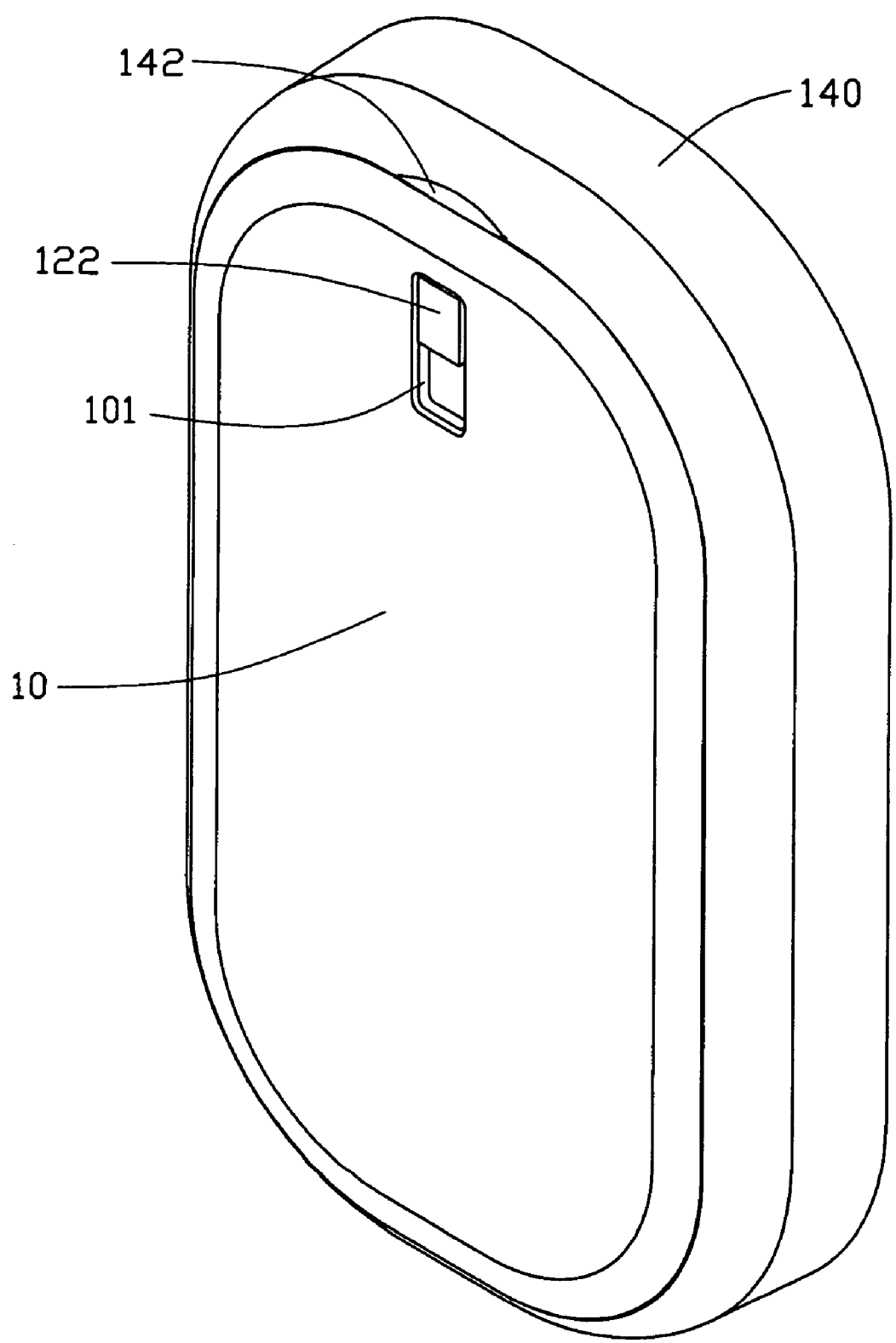
FIG. 5 is similar to FIG. 4, but viewed from another aspect.

In assembly, referring now to FIGS. 3 through 5, the button 122 and the groove 123 of the moveable member 12 are respectively aligned with the button hole 101 and the ribs 103 of the cover 10. Then, the moveable member 12 is pressed onto an inside of the cover 10. The top ends 1030 of the ribs 103 are deformably received through the groove 123, such that the ribs 103 become slidably engaged in the groove 123. At the same time, the button 122 is received in the button hole 101. The moveable member 12 is thus slidably attached to the cover 10. Next, the arcuate slot 1316 of the first elastic member 131 is aligned with a corresponding projection 104 of the cover 10. Then, the first elastic member 131 is pressed onto the inside of the cover 10, so that the projection 104 is engaged in the arcuate slot 1316. At the same time, the top first blocking arm 1317 and the free end of the top concave portion 1311 are wedged between one end of the upper second arm 126 and a top one of the limiting blocks 105. Further, one end of the lower second arm 126 is wedged in a corner between the projecting portion 1313 and the bottom second blocking arm 1318. Still further, the free end of the bottom concave portion 1311 abuts a bottom one of the limiting blocks 105. The first elastic member 131 is thus mounted on the cover 10 and connected with the moveable member 12. Then the first second member 132 is pressed onto the inside of the cover 10. The assembly process of the second elastic member 132 is essentially the same as the above-described assembly process of the first elastic member 131.

With the elastic apparatus 13 mounted on the cover 10, the next step is for the cover 10 to be mounted in the housing 14. First, the tabs 102 of the cover 10 are inserted into the tab holes 146 of the housing 14. At the same time, the claws 125 of the moveable member 12 are aligned opposite the latching grooves 144, and the clasps 1314, 1324 are aligned opposite the latching holes 145. Next, the cover 10 is pressed onto the housing 14. Accordingly, the wedge-shaped ends 1250 of the claws 125 deformably engage into the latching grooves 144, and the beveled surfaces 1315, 1325 deformably engage into the latching holes 145. The claws 125 and the clasps 1324, 1314 rebound, and are thus movably engaged in the latching grooves 144 and the latching holes 145 respectively. The cover 10 is thus removably attached on the housing 14.

When the cover 10 is detached from the housing 14, the button 122 is pushed down by a user's finger. The moveable member 12 is brought to slide down, and the claws 125 of the first arms 124 slide out from engagement with the partition wall 141 in the latching grooves 144. At the same time, the second arms 126 also slide down, and elastically deform the first elastic member 131 and the second elastic member 132. This is because the limiting blocks 105 of the cover 10 prevent the first elastic member 131 and the second elastic member 132 from bending toward the left and right sidewalls 113, 114 respectively. Accordingly, the clasps 1314 and the clasps 1324 move out from engagement with the partition wall 141 in the latching holes 145. Finally, the cover 10 is pulled away from the housing 14 by means of the user putting his/her finger in the concavity 142.

In alternative embodiments, the first elastic member 131 may have only a single concave portion 1321. The arcuate slot 1316 may be defined in the concave portion 1321 instead of the projecting portion 1323. Accordingly, the second elastic member 132 may be configured according to the first elastic member 131, and the moveable member 12 may have only one second arm 126. Further, the housing 14 may have only one pair of latching holes 145 corresponding to the first elastic member 131 and the second elastic member 132.

In further alternative embodiments, only a first elastic member 131 or a second elastic member 132 may be provided in the cover 10. Accordingly, the second arms 126 may be disposed at one side only of the main beam 121 of the moveable member 12.

As described above, the preferred embodiment provides a battery cover assembly for devices such as mobile phones. When the button is pushed, the cover of the battery cover assembly can be easily removed. This provides the user with convenient operation of the device.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A foldable electronic device comprising a housing and a battery cover assembly, said battery cover assembly comprising:
   a battery cover, the battery cover defining a button hole and having a surface;
   a moveable member comprising a button received in the button hole, the moveable member locking one portion of the battery cover to the housing; and
   an elastic apparatus resisting the moveable member and locking another portion of the battery cover to the housing; wherein
   when the button of the moveable member is moved along a direction parallel with the surface of the battery cover, the moveable member is detached from the housing, and the elastic apparatus is pushed by the moveable member to be detached from the housing so that the battery cover is unlocked from the housing.

2. The foldable electronic device as claimed in claim 1, wherein the elastic apparatus comprises a first elastic member and a second elastic member, which are respectively attached to the cover.

3. The foldable electronic device as claimed in claim 2, wherein the first elastic member comprises two concave portions, the second elastic member comprises another two concave portions, the housing defines a total of four latching holes, each concave portion includes a clasp, and the clasps of the concave portions of the first and second elastic members detachably engage in the latching holes.

4. The foldable electronic device as claimed in claim 1, wherein the battery cover further comprises a pair of ribs, the moveable member includes a main beam, the main beam defines a groove, and the ribs are slidably engaged in the groove.

5. The foldable electronic device as claimed in claim 4, wherein the moveable member comprises a first arm and two second arms, all of which are perpendicular to the main beam.

6. The foldable electronic device as claimed in claim 5, wherein the elastic apparatus further comprises a first blocking arm and a second blocking arm, and the first blocking arm and the second blocking arm resist the second arms of the moveable member.

7. The foldable electronic device as claimed in claim 6, wherein an end of the first arm has a claw, the housing defines a latching groove, and the claw detachably engages in the latching groove.

8. An electronic device comprising:
   a housing of said electronic device defining a space therein to accommodate a separable component of said electronic device, said space exposable to a side of said housing in order to have said component replaceable through said side of said housing;
   a cover removably attachable to said side of said housing for covering said exposable space thereof;
   two elastic members attachable to a first selective one of said housing and said cover, each of said two elastic members capable of being engagable with the other of said housing and said cover and fixing said cover to said housing when said cover moves against said housing; and
   a movable member attachable to a second selective one of said housing and said cover and positionable between said two elastic members, and comprising a button exposable out of said electronic device to be operable, operation on said button capable of triggering said movable member bringing said each of said two elastic members to deform along directions symmetrically opposite to directions along which the other of said two elastic members deforms so as to disengage said each of said two elastic members from said other of said housing and said cover.

9. The electronic device as claimed in claim 8, wherein said movable member comprises at least one claw extending away from said second selective one of said housing and said cover toward the other of said housing and said cover so as to be engagable with said other of said housing and said cover and fix said cover to said housing, and said operation of said button is capable of disengaging said at least one claw from said other of said housing and said cover.

10. A portable electronic device, comprising:
    a battery cover, the battery cover defining a button hole, one side of the battery cover comprising a locking portion;
    a moveable member, the moveable member comprising a main beam and at least one arm, the main beam including a button received in the button hole, the moveable member being slidably attached to the battery cover;
    an elastic apparatus, the elastic apparatus comprising at least one concave portion and defining at least one engaging hole, the at least one concave portion including a clasp, the locking portion of the battery cover engaging in the at least one engaging hole, the at least one concave portion resisting the arm of the moveable member; and
    a housing, the housing defining at least one latching hole, the clasp of the at least one concave portion of the elastic apparatus detachably engaging in the at least one latching hole of the housing.

11. The portable electronic device as claimed in claim 10, wherein the locking portion includes at least one arc projection, and the at least one arc projection engages in the at least one engaging hole.

12. The portable electronic device as claimed in claim 10, wherein the battery cover further comprises a pair of ribs, the main beam defines a groove, and the ribs are slidably engaged in the groove.

13. The portable electronic device as claimed in claim 10, wherein the battery cover further comprises at least one block, which is disposed at the side of the battery cover.

14. The portable electronic device as claimed in claim 10, wherein at least one detent is disposed at one end of the battery cover, the housing defines at least one detent hole, and the at least one detent removably engages in the at least one detent hole.

15. The portable electronic device as claimed in claim 10, wherein the at least one arm of the moveable member comprises a first arm and two second arms, all of which are perpendicular to the main beam.

16. The portable electronic device as claimed in claim 15, wherein the elastic apparatus further comprises a first blocking arm and a second blocking arm, and the first blocking arm and the second blocking arm resist the second arms of the moveable member.

17. The portable electronic device as claimed in claim 15, wherein an end of the first arm has a claw, the housing defines a latching groove, and the claw detachably engages in the latching groove.

18. The portable electronic device as claimed in claim 10, wherein the elastic apparatus comprises a first elastic member and a second elastic member, each of the first and second elastic members comprising at least one of the at least one concave portion and one of the at least one engaging hole and being respectively attached to the battery cover by the engagement of the locking portion of the battery cover in said one of the at least one engaging hole.

19. The portable electronic device as claimed in claim 18, wherein the at least one concave portion of the elastic apparatus comprises four concave portions, the first elastic member comprises two of the concave portions, the second elastic member comprises another two of the concave portions, the at least one latching hole of the housing comprises four latching holes, and the clasps of the concave portions of the first and second elastic members detachably engage in the latching holes.

20. The electronic device as claimed in claim 18, wherein the at least one latching hole of the housing is at least two latching holes, the clasp of said at least one of the at least one concave portion of each of the first and second elastic members extends away from the battery cover toward the housing so as to be detachably engagable in a corresponding one of the latching holes of the housing, and operation of the button of the moveable member is capable of elastically deforming the concave portions of the first and second elastic members such that the clasps of the first and second elastic members disengage from the corresponding latching holes of the housing.

* * * * *